United States Patent [19]

Hilleveld et al.

[11] Patent Number: 5,487,278
[45] Date of Patent: Jan. 30, 1996

[54] BACK-UP SWITCHING SYSTEM FOR REFRIGERATOR TRUCKS

[75] Inventors: Jerry Hilleveld; William A. Martherus, both of Garden Grove, Calif.; Kenneth J. Hartman, Crystal Lake, Ill.

[73] Assignee: Kenneth J. Hartman, Crystal Lake, Ill.

[21] Appl. No.: 239,299

[22] Filed: May 6, 1994

[51] Int. Cl.⁶ .................................................. F25B 27/00
[52] U.S. Cl. .............................. 62/236; 62/230; 62/323.3
[58] Field of Search ........................ 62/236, 239, 323.1, 62/323.3, 323.4, 126, 127, 129, 230

[56] References Cited

U.S. PATENT DOCUMENTS

| | | |
|---|---|---|
| 2,636,356 | 4/1953 | Ryan et al. . |
| 2,746,268 | 5/1956 | Sellstrom . |
| 2,962,873 | 12/1960 | Anderson ........................... 62/323.3 X |
| 3,142,013 | 7/1964 | McGrath et al. . |
| 3,512,373 | 5/1970 | White ................................. 62/239 X |
| 3,545,222 | 12/1970 | Petranek ............................. 62/236 |
| 3,603,806 | 9/1971 | Hitzke . |
| 3,646,773 | 3/1972 | Falk et al. ........................... 62/236 X |
| 3,721,880 | 3/1973 | Neill . |
| 3,742,302 | 6/1973 | Neill . |
| 4,022,598 | 5/1977 | Guewa, Jr. et al. . |
| 4,134,272 | 1/1979 | Reimann . |
| 4,403,942 | 9/1983 | Copenhaver . |
| 4,432,030 | 2/1984 | Briccetti . |
| 4,476,920 | 10/1984 | Drucker et al. . |
| 4,703,191 | 10/1987 | Ferguson . |
| 4,707,618 | 11/1987 | Haas . |
| 4,723,703 | 2/1988 | Thompson . |
| 5,237,480 | 8/1993 | Dara . |

FOREIGN PATENT DOCUMENTS 2164433  3/1986  United Kingdom ..................... 62/236

Primary Examiner—Harry B. Tanner
Attorney, Agent, or Firm—Lee, Mann, Smith, McWilliams, Sweeney & Ohlson

[57] ABSTRACT

A back-up switching system for a refrigeration unit in a trailer wherein the refrigeration unit includes a compressor and diesel engine normally operative and connected to the compressor. A standby electric motor is alternately operatively connected to the compressor and actuated by A/C power line for running the compressor instead of the diesel engine. The invention provides a back-up switching relay system connected to the A/C voltage for selectively applying the voltage to the standby motor. The backup switching system is responsive to a first signal from the A/C voltage if there is a power failure or to a second signal when there is a standby motor failure to generate a signal to close the diesel relays and operate the diesel engine. Upon reactivation of the previously failed A/C voltage source or standby motor a relay off signal is provided to the diesel relay system and the refrigeration unit is then again operated by line voltage to the standby motor.

6 Claims, 5 Drawing Sheets

R1 SOCKET

BACK-UP SWITCHING SYSTEM FOR REFRIGERATOR TRUCKS

BACKGROUND OF THE INVENTION

The invention relates to protecting the contents of a refrigerator truck trailer from lack of refrigeration caused by a failure in either of two power sources. More particularly, the invention is directed toward a back-up system that allows for the automatic switching from a first power source to a second power source upon the failure of the first. Even more specifically, the invention is primarily intended for use in refrigerator trucks having a diesel engine for operating a compressor and a standby motor operable by standard household A/C voltage wherein a standard cab control switch system is provided for operation of the refrigeration unit. In this last-mentioned type of system, the present invention is provided to offer a back-up automatic source switching system to said refrigeration control switch for automatically switching from the A/C line voltage to start the diesel generator or alternatively switching to the live A/C voltage line at the event of a failure of the diesel engine to continue an electrical operation of the compressor.

The prior art includes refrigeration units for trucks and fault or failure protection circuitry systems. Some of these utilize a hydraulic pump motor connection between the truck engine and the refrigerant compressing unit for eliminating previous disadvantages where separate internal combustion engines were used for driving compressors. Thus while dual modes of operation have been disclosed, the prior art has not suggested automatic means for shifting from the live service A/C line to the diesel engine for operating the compressor. Other systems utilize an over-running clutch for automatically disconnecting a power transmission from the electric motor. These type systems however are not found to have automatic means for starting a diesel engine when there is a power failure at the outlet box but merely provide for automatic disconnection of the power transmission from the electric motor.

Generally related power failure detection and switching systems have also provided for a very small trip window switching time that is accomplished by a synchronization of the zero-crossing of the primary power signal and the auxiliary power signal so that out-of-phase switchover problems, such as transformer saturation, do not occur. These systems have special use in computer operations. Similar systems provide back-up capabilities of the SPS-type consisting preferably of a static invertor operated only when a main current line fails. These systems are critical so that even intolerable 100 microsecond interruptions are avoided.

Of course other types of systems detect fault and isolate faults that occur in circuit boards, which provide for interrupting one circuit board from the main power supply when a short occurs.

Certain other refrigeration systems achieve a switchover from one power source to another when a power circuit voltage is within a predetermined range. Normally these systems utilize a high pressure switch connected to a relay means arranged with a voltage dependent means for deenergizing the relay means when pressure within a refrigeration system is not within a predetermined range. These also have required the use of time delay mechanisms connected to the relay means to allow the relay to be energized for a predetermined period of time during which the voltage dependent means may be by-passed. Such systems may select the appropriate mode of operation but usually require a delay for a predetermined time period during start up of an internal motor unit for the compressor when the voltage is not within a proper range. The primary goal of these types of system is the protection of the internal components of the refrigeration unit due to malfunction and involve technology known for at least about twenty years. Time delay startups are provided until voltage reaches a predetermined range. None of these systems provide back-up for failure of A/C power supply and/or standby motor failure with the capability to switch to and start the diesel generator motor on the refrigeration truck trailer; or an automatic switch back when A/C power is restored or upon reactivation of a previously failed standby motor.

The present invention is useful as a back-up for present cab commands/control circuit and switching systems which may be patched into the system of existing controls to provide necessary back-up and failure protection in a very efficient and economical modification.

BRIEF SUMMARY OF THE INVENTION

The present invention provides a back-up switch device to restart the diesel engine associated with a refrigerator compressor on a refrigerator trailer to operate the compressor when there is a failure of either the standby motor or the A/C voltage power supply energizing the standby motor. Both the power supply, standby motor and diesel engine are connected to a refrigerator control and monitoring system located on the trailer and connected to a cab command panel. In the event that either the A/C line voltage/standby motor or diesel engine fail the inventive switch system utilizes relays to send or terminate signals to the control panel for initiating a start signal to the diesel engine of the tractor or alternatively switching from a failed diesel engine to an active A/C line voltage for operation of an operable standby electric motor.

The back-up system provides automatic action to operate the cab command circuitry, which would otherwise be only capable of manual switching.

For example, when a tractor trailer is, pulled into a terminal yard overnight, or is otherwise waiting for further transit instructions, the truck operator would switch the conventional cab command to energize the standby electric motor by virtue of conventional 240 volt A/C input from the power source located in a truck terminal parking lot. Should a power failure occur in the A/C voltage, the refrigeration system would fail because the standby motor would not be receiving power to maintain operation of the compressor. Likewise, should the electric standby motor fail the compressor would similarly not function. The invention allows for a detection of these failures whereby relays are tripped so that a signal to the control circuitry of the refrigeration system is sent, or a signal is stopped, to thereby initiate a start signal to the diesel engine on the trailer to begin operation and provide electric current to the compressor, so that the contents of the trailer are maintained at the desired cold refrigerated condition. The refrigeration system including the compressor are separately monitored by a conventional control system and not affected or involved in the present invention.

DETAILED DISCUSSION OF THE PREFERRED EMBODIMENT

Figure 1:
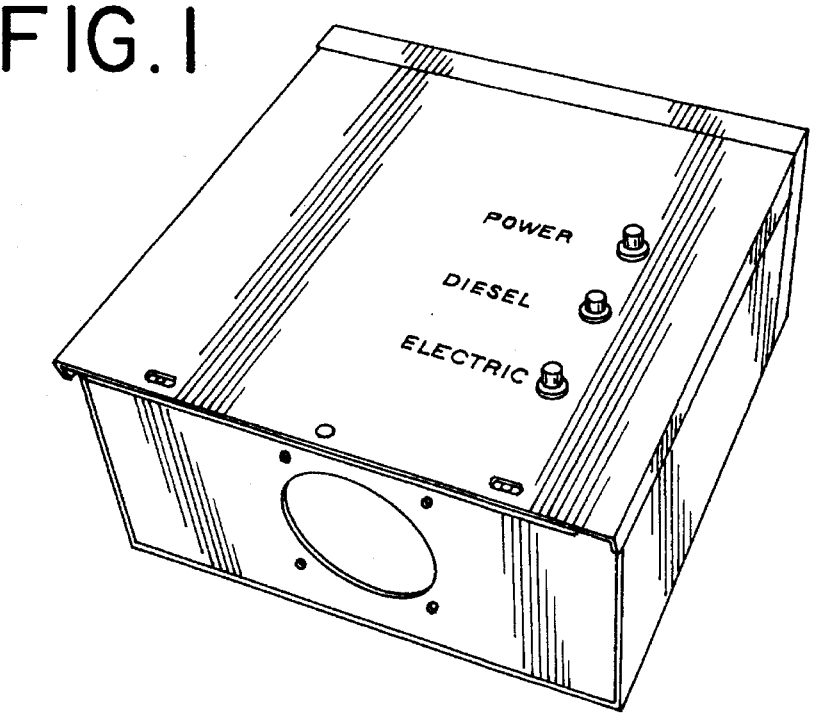
FIG. 1 is a perspective view of the invention back-up system and housing therefor.

In the figures, a preferred embodiment of the invention is provided showing two alternate utilizations with well known refrigeration unit control circuitry operative with cab command panels in the truck tractor. In FIG. 1, a housing is shown for accommodating the back-up switching system of the invention and is used for mounting at the power connect outlet usually found on refrigeration trailers. The housing has exposed indicator lights showing in descending sequence: that the power is on (green light); that the refrigeration system is in the diesel generated mode (blue light); or when the refrigeration system of the trailer is in the electric mode (red light). The diesel mode meaning that the diesel motor mounted with the compressor on the trailer is activated to be the driving force for the compressor. Of course the electric mode indicates that an outside A/C power supply is being used for operating the electric standby motor such as an electric motor driving a household refrigerator. In the electric supply mode the system therefore does not require the continuous operation of an expensive diesel motor. This latter circumstance would occur when a trailer is left in a storage mode at a truck terminal or adjacent a delivery site such as a warehouse that cannot immediately receive the refrigerated contents of the trailer.

Figure 2:
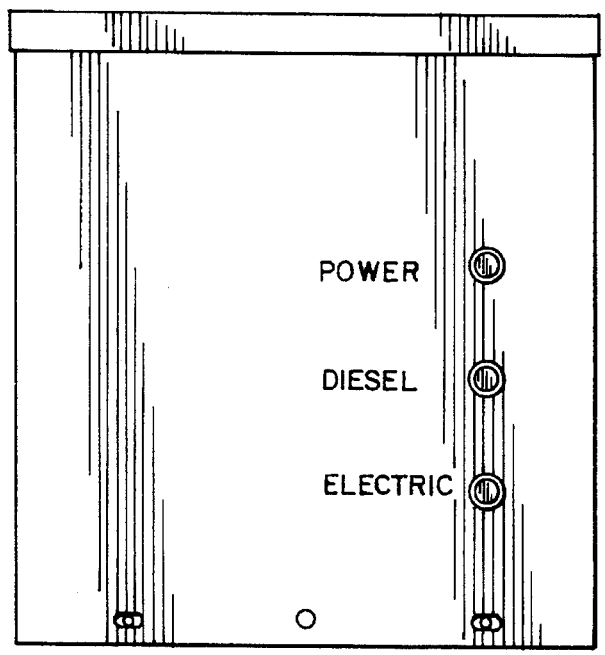
FIG. 2 is an elevational view of the back-up system and housing of FIG. 1.

FIG. 2 is a front elevational view of the switch housing of FIG. 1 showing the power diesel and electric indicator lights in the front face panel of the housing.

Figure 3:
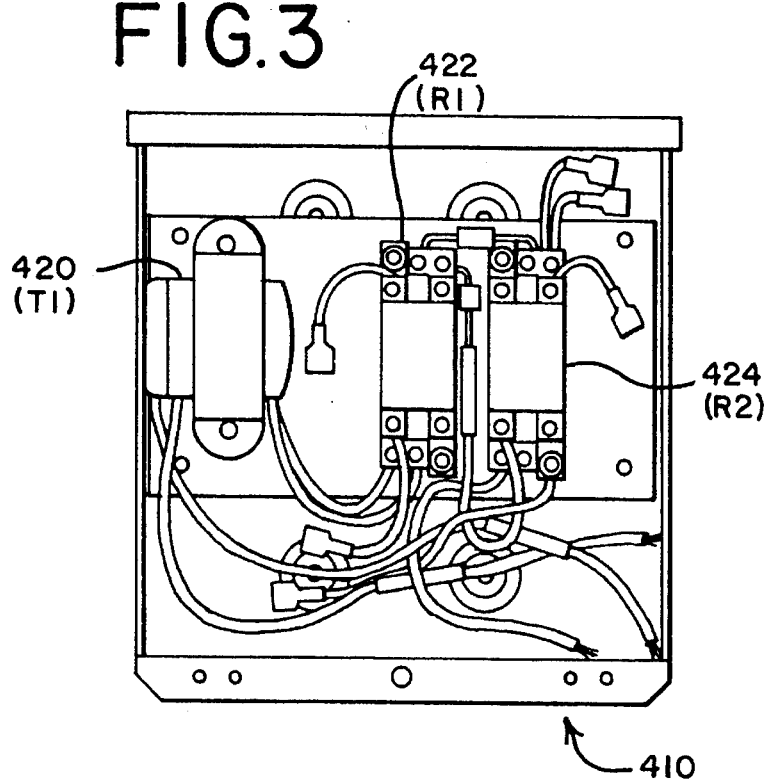
FIG. 3 is a plan view of the interior of the housing of FIG. 1, showing a transformer and relays of the back-up system.
Figure 7:
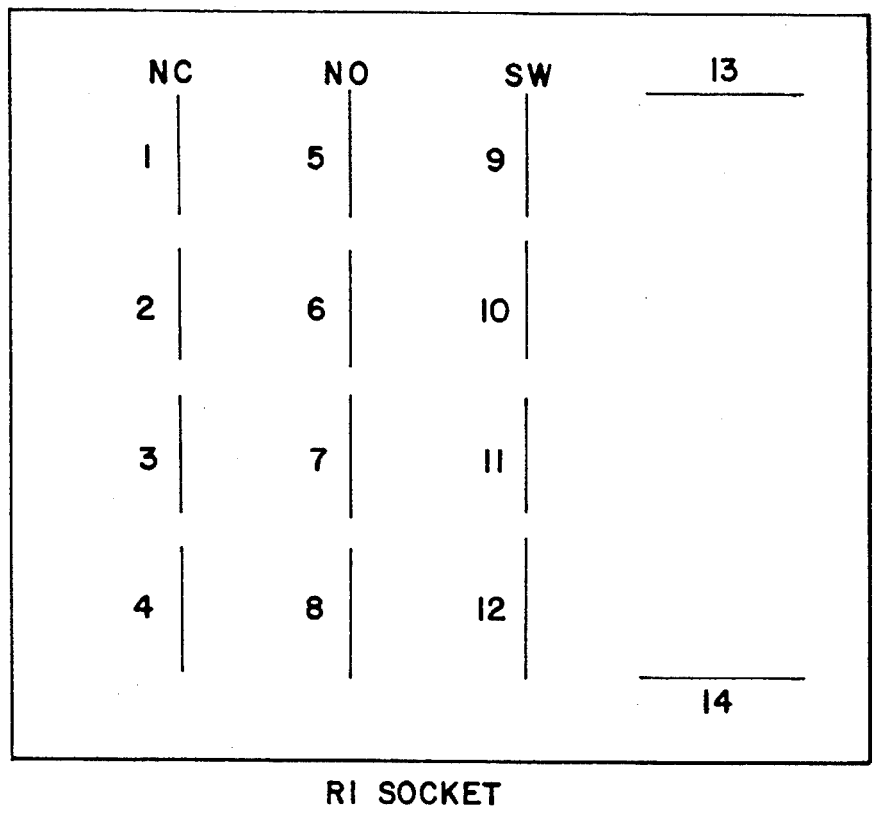
FIG. 7 shows a relay (R1) socket with N/C, N/O states of the switch for the system of FIG. 6.

FIG. 3 is a plan view looking interiorly of the housing with the front panel removed to expose the back-up switching system of the invention. Therein a transformer T1 and relays R1 and R2 are provided for interconnection with the command control circuitry of the refrigeration system. The embodiment in FIGS. 1–3 is provided for adaptation to a refrigeration system made by Carrier Company under the brand names STARTRONIC and KINGBIRD. Appendix A (submitted with the application and located in the file history) provides the schematic diagrams and informational literature as to this system.

Another embodiment is adapted for use in another well known refrigeration control circuitry made by Thermo King Corporation under the designation TK TD II MAX. The schematic diagrams and informational literature as to this system are provided in Appendix B (submitted with the application and located in the file history).

Among other variations for application of the invention to the refrigeration systems shown for the Carder Company and Thermo King is the use of either the combination of a 24 volt A/C relay with a 240 A/C relay for the Carrier system and the combination of a twelve volt A/C and 24 volt A/C relay for use in the Thermo King system. These applications will be explained in the following.

Figure 4:
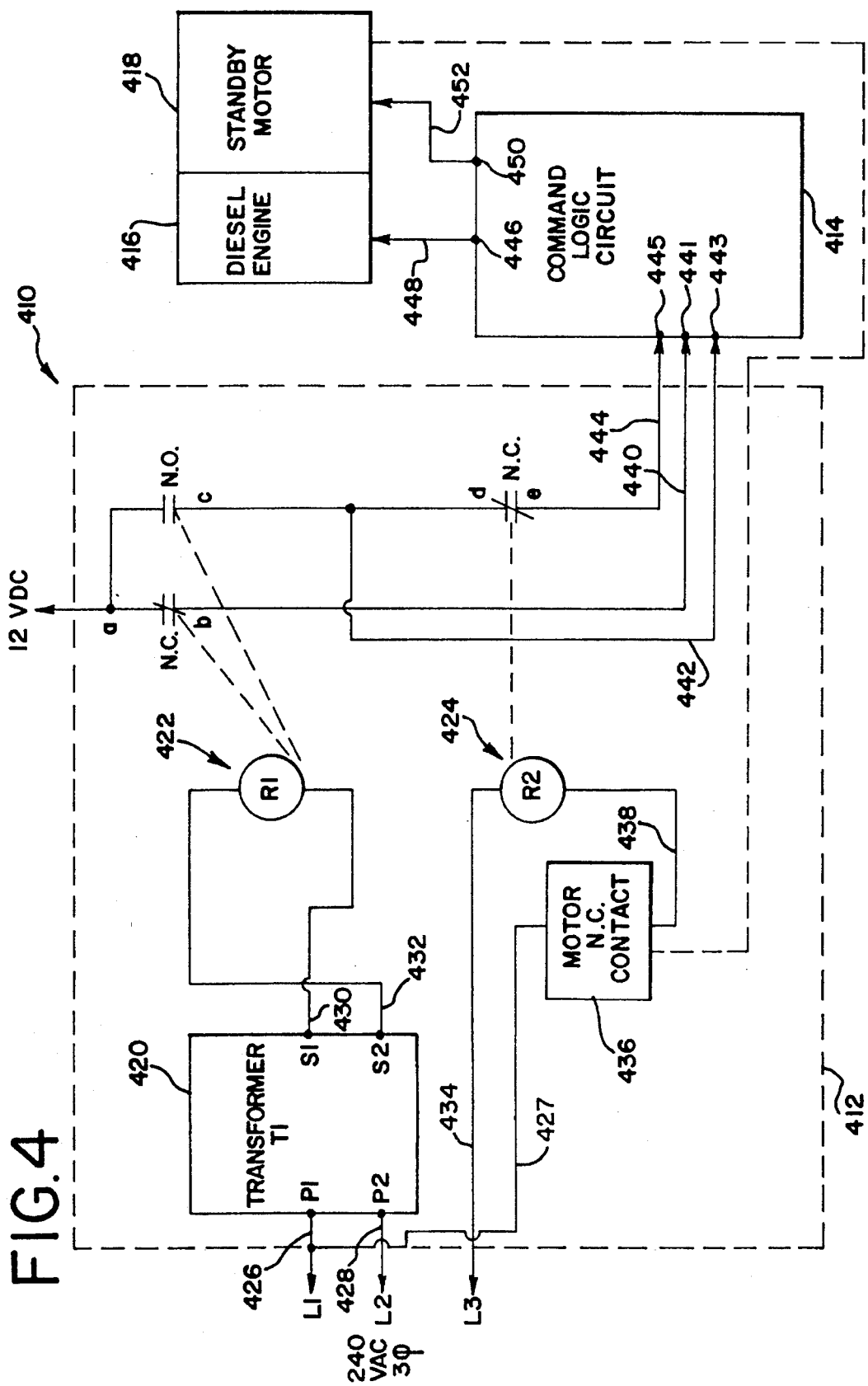
FIG. 4 is a block diagram of the back-up system and switch therefor for connection to a conventional refrigeration control system to provide for the automatic back-up switching from a failed A/C power source to a diesel engine and return to when the A/C power is reactivated.

In FIG. 4, there is shown a simplified block diagram of a back-up system 410 for a refrigeration unit located in a parked trailer and the like, constructed in accordance with the principles of the present invention. The back-up system 410 is comprised of a "smart switch" block 412 interconnected between a source of A/C voltage such as 240 VAC, 3 PHASE and a command logic circuit 414. The command logic circuit has its inputs connected to the outputs of the switch block 412. The logic circuit has a first output connected to a diesel engine 416 and a second output connected to a standby electric motor 418. Both the diesel engine and the standby motor are operatively connected to a compressor (not shown) in the refrigeration unit for running the same.

The switch block 412 includes a transformer 420 (T1), a first relay 422 and a second relay 424. The primary terminals P1 and P2 of the transformer 420 are connected to lines 426 and 428 for receiving the source of A/C voltage on the respective input terminals L1 and L2. The secondary terminals S1 and S2 of the transformer 420 are connected across the coil R1 of the first relay 422 via lines 430 and 432. The first relay is provided with a normally-closed contact a-b and a normally-open contact a-c. One side of the coil R2 of the second relay 424 is connected to the line 434 for joining the input terminal L3. The other side of the coil R2 of the second relay is connected to one end of a motor normally-closed contactor 436 via line 438. The other side of the contactor 436 is also connected to the line 426 and the input terminal L1. The normally-closed contactor 436 is controlled by the standby motor 418 and will become open when there is a malfunction in the standby motor. The second relay 424 is provided with a normally-closed contactor d-e which is connected in series with the normally-open contact a-c of the first relay 422.

As can be seen, one side of the normally-closed contact a-b of the first relay 422 is connected to a power supply of 12 VDC, and the other side thereof is connected to line 440 for generating a first signal to an input terminal 441 of the command logic circuit 414. One side of the normally-open contact a-c of the first relay 422 is also connected to the power supply, and the other side thereof is connected to line 442 for generating a second signal to an input terminal 443 of the command logic circuit 414. One side of the normally-closed contact d-e of the second relay 424 is also connected to the other side of the normally-opened contact a-c of the first relay 422. The other side of the normally-closed contact d-e is connected to line 444 for generating a third signal to an input terminal 445 of the command logic circuit 414. The command logic circuit has a first output terminal 446 for providing a diesel start signal which is fed to the diesel engine 416 via line 448 and has a second output terminal 450 for providing a standby start signal which is fed to the standby motor 418 via line 452.

In operation, when the trailer is parked the diesel engine 416 will be normally turned off and the input terminals L1, L2 and L3 will be plugged into an electric outlet so as to receive a source of A/C voltage. As a result, the transformer 420 will step down the 240 VAC applied across its primary terminals P1 and P2 and will provide a 24 VAC on the secondary terminals S1 and S2 in order to energize the coil of the first relay 422. Assuming that there is no malfunction in the standby motor 418, the normally-closed contactor 436 will remain closed and the 240 VAC on the input terminals L1 and L3 will cause the coil R2 of the second relay 424 to be energize. Thus, the 12 VDC will be passed through the normally-open contact a-c (which is now closed) in order to supply the second signal on the line 422 to the input terminal 443 of the command logic circuit 414. The command logic circuit will then cause the standby start signal to be sent via the line 452 to the standby motor 418 for turning on the same in order to operate the compressor in the refrigeration unit.

Upon the occurrence of a power failure condition (loss of the source of A/C voltage), the first relay 422 will become de-energized. The normally-closed contact a-b of the first relay 422 detects this power failure, and the 12 VDC will be passed through it in order to provide the first signal on the line 440 to the input terminal 441 of the command logic circuit 414. The command logic circuit then causes the diesel start signal to be sent via the line 448 to the diesel engine 416 for turning on the same in order to operate the compressor in the refrigeration unit.

Assume now that there is no power failure but the standby electric motor has a malfunction which causes the normally-closed contactor 436 to open. As a consequence, the second relay 424 will become de-energized. The normally-closed contact d-e of this second relay detects this malfunction, and the 12 VDC will be passed through the normally-opened a-c (which is now closed) of the first relay 422 and the normally-closed contact d-e of the second relay 424 in order to provide the third signal on the line 444 to the input terminal 445 of the command logic circuit 414. The command logic circuit will again cause the diesel start signal to be sent via the line 448 to the diesel engine 418 for turning on the same in order to operate in the compressor in the refrigeration unit.

In the case of a power failure, once power is resumed the first relay 422 will become re-energized and the first signal will be sent to the command logic circuit which will cause the standby motor 418 to turn automatically back on and cause the diesel engine 416 to turn automatically off. However, if there is a subsequent malfunction in the standby motor, the second relay 424 will again become de-energized and the third signal will be sent to the command logic circuit 414 which will cause the standby motor to turn automatically back on.

It should be clear that the back-up system 410 of the present invention will cause the diesel engine 416, which is normally turned off when the trailer is parked, to be turned on in the event of a power failure or a malfunction in the standby motor. Further, when power is returned, the standby motor will automatically turn back on and the diesel engine will be automatically turned off unless there is a malfunction in the standby motor. In this latter condition, the diesel engine will again be turned back on.

Figure 5:
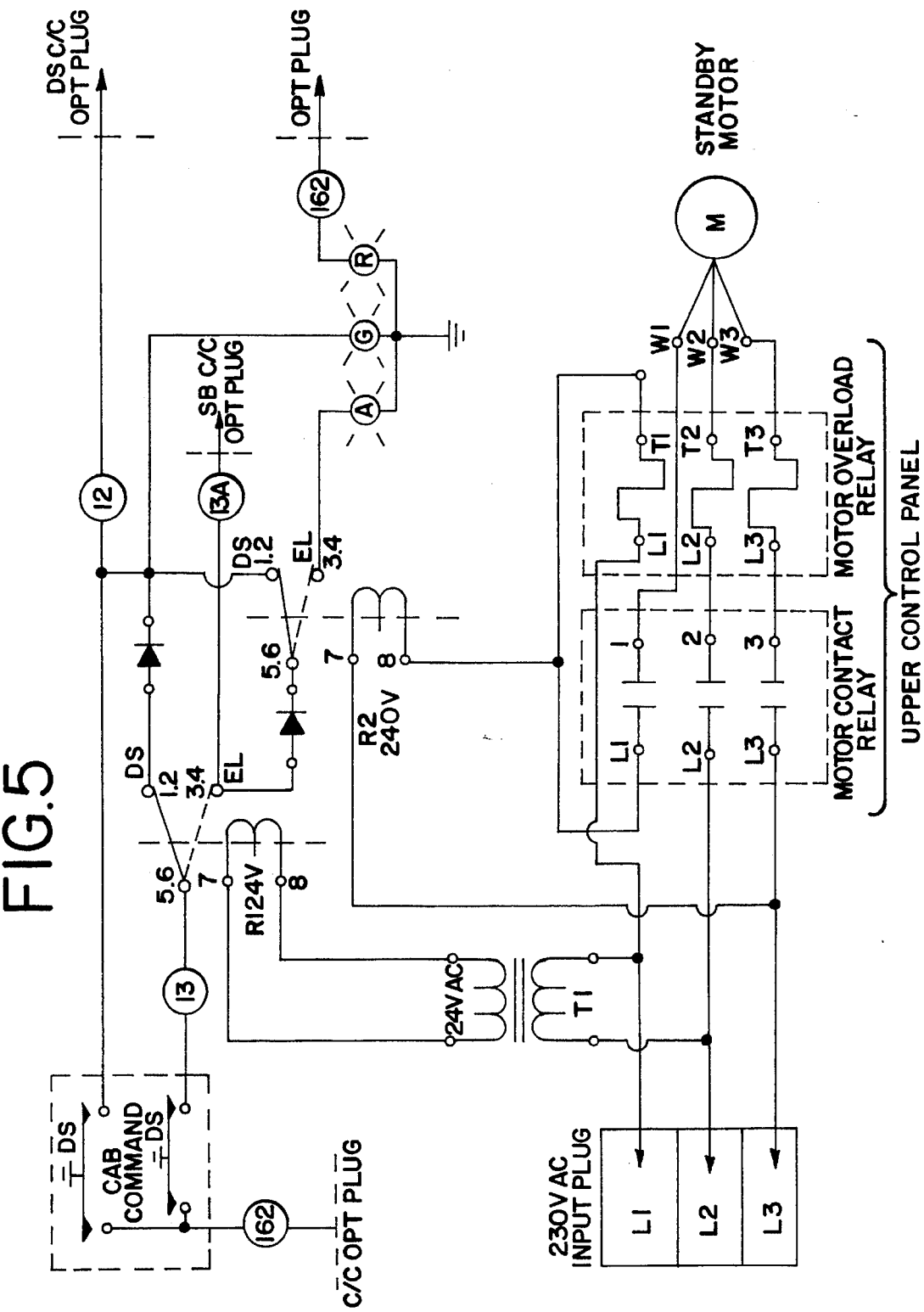
FIG. 5 is a schematic diagram of the refrigeration switch system of FIG. 4 in one conventional refrigeration control circuit.
Figure 6:
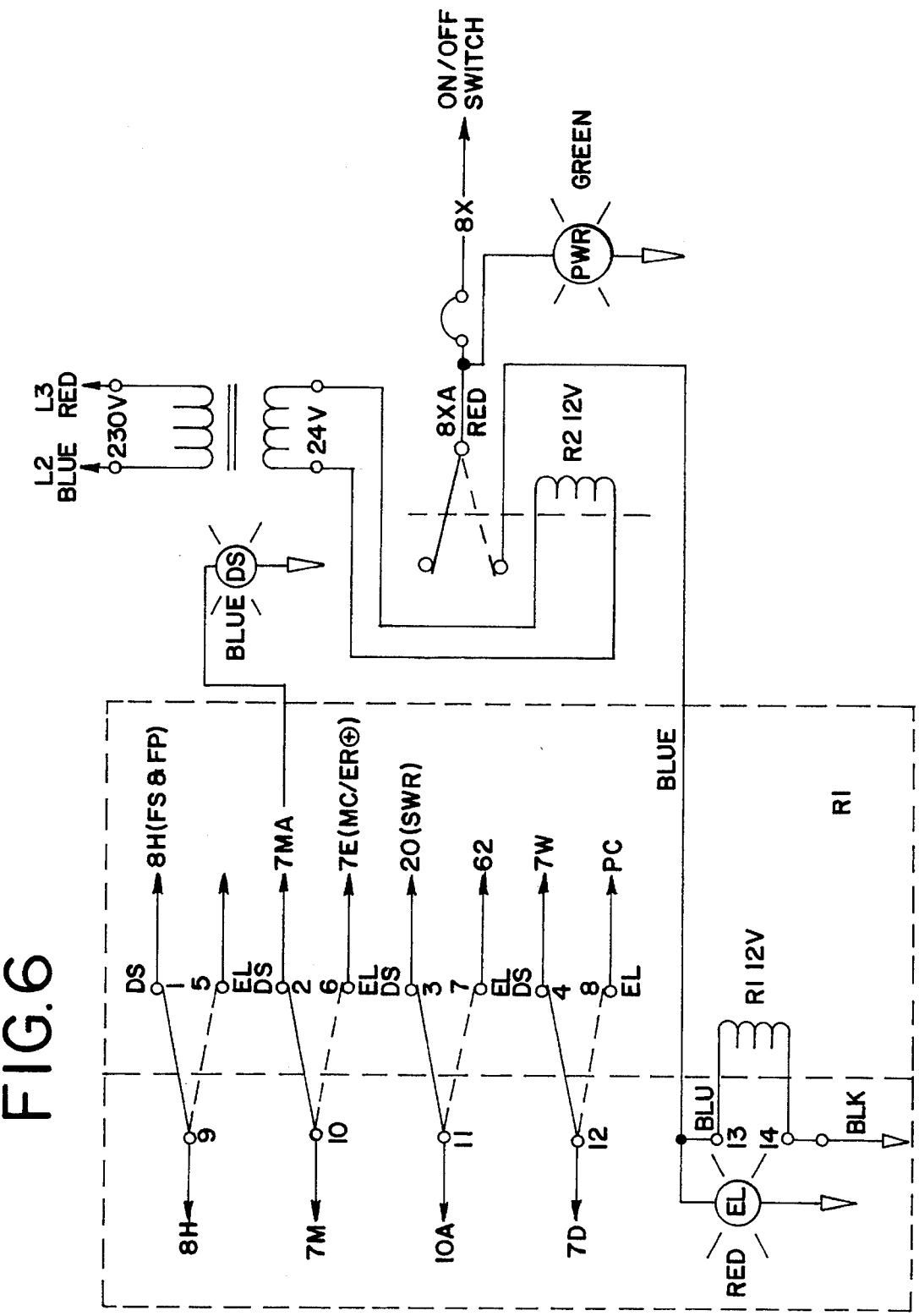
FIG. 6 is a schematic diagram of the refrigeration switch system of FIG. 4 for use with another conventional refrigerator control circuit.

In FIG. 5, there is shown a detailed schematic circuit diagram of one embodiment for implementing the back-up system shown in FIG. 4. In FIG. 6, there is shown a detailed schematic circuit diagram of a second embodiment for implementing the back-up system shown in FIG. 4. The values and components employed in FIGS. 5 and 6 were constructed and tested and were found to provide a high quality performance. It will be recognized by those skilled in the art that many alternative elements and values may be employed in constructing the circuits in FIG. 5 and 6 in accordance with the present invention.

ACHIEVEMENTS OF THE INVENTION

The invention achieves the important goal of providing a back-up switching system which automatically provides for switching from an A/C power line and/or standby motor when either has failed to reactivate the normal diesel motor for operation of a refrigeration compressor on a trailer. Thus a trailer may be parked at a truck terminal, warehouse dock, factory, etc. and be operated for long periods of time by standard 240 A/C outlet current until the load in trailer needs to be removed. If there is failure in the line voltage, or the standby motor, relays are opened to then initiate signal to the command logic circuit of the refrigeration system to close the diesel relays and reactivate the diesel engine. Once power is regained at the A/C line voltage or a failed standby motor is reactivated, a relay system then closes and in turn opens up the diesel relay switch system to deactivate the diesel motor.

What is claimed is:

1. A back-up system for a refrigeration unit in a trailer and the like, said back-up system comprising in combination:

a compressor located in the trailer for operating the refrigeration unit;

a diesel engine operatively connected to said compressor;

a stand-by electric motor also operatively connected to said compressor for normally running said compressor when said trailer is parked;

first relay means operatively connected to a source of A/C voltage for generating a first signal when there is a power failure condition and for generating a second signal when there is no power failure;

second relay means also operatively connected to the source of A/C voltage and to normally-closed contact means of said standby motor and being responsive to said second signal for generating a third signal when there is a malfunction in said standby motor and there is no power failure;

command logic circuit means being responsive to either the first signal from said first relay means or the third signal from said second relay means for generating a diesel start signal;

said command logic circuit means being responsive to said second signal from said first relay means for generating a standby start signal;

said standby motor being responsive to said standby start signal for turning on the same in order to operate said compressor; and said diesel engine being normally turned off when said trailer is parked and being responsive to said diesel start signal for turning on the same in order to operate said compressor.

2. A back-up system as claimed as in claim 1, wherein said first relay means includes normally-closed contact means for detecting when there is a power failure in said source of AC voltage in order to generate said first signal and a normally-open contact means for detecting when there is no power failure in said source of A/C voltage in order to generate said second signal.

3. A back-up system as claimed as in claim 2, wherein said second relay means further includes normally-closed contact means for detecting when there is a failure in said stand-by motor in order to generate said third signal.

4. A back-up system as claimed as in claim 1, wherein said normally-closed contractor means of said standby motor becomes open when there is a malfunction in said standby motor.

5. In a command logic circuit system for a refrigeration trailer system or the like having means responsive to either of two signals for generating a diesel start signal and means responsive to another signal for generating a standby start signal, a compressor for operating the refrigeration unit, a diesel engine for operating said compressor, a standby electric motor also operatively connected to the compressor for running the compressor when the trailer is parked, the improvement comprising a back-up system for switching to the diesel engine when either an A/C supply for the standby electric motor or the standby electric motor fail and for switching back to the A/C power source and standby motor from the diesel engine when both said A/C power source and standby motor are functional, said back-up system comprising;

first relay means operatively connected to a source of A/C voltage for generating a first signal when there is a power failure condition and for generating a second signal when there is no power failure;

second relay means also operatively connected to the source of A/C voltage and to normally-closed contact means of said standby motor and being responsive to said second signal for generating a third signal when there is a malfunction in said standby motor and there is no power failure;

said means responsive to either of two signals in said command logic circuit means being capable of responding to said first signal from said first relay means or the third signal from said second relay means for generating the diesel start signal and said means responsive to another signal in said command logic circuit means being responsive to the second signal from said first relay means for generating the standby start signal;

wherein the standby motor is responsive to the standby start signal for turning on the standby motor to operate the compressor, the diesel engine being normally turned off when the trailer is operated by said standby motor and being responsive to the diesel start signal for turning on the diesel engine in order to operate the compressor.

6. A back-up system for a mobile refrigeration unit, said back-up system comprising:

a compressor mounted on said mobile refrigeration unit for operation of refrigeration unit;

a diesel engine for operating said compressor;

a standby electric motor alternately operable to operate said compressor;

a first relay means electrically connected to an A/C voltage source for generating a first signal if the A/C voltage source fails and for generating a second signal if there is no power failure;

a second relay means also electrically connected to the A/C voltage source and to a normally-closed contact means of the standby motor, the second relay means being responsive to the second signal of the first relay means for generating a third signal if there is a malfunction of the standby motor and there is no power failure of the A/C voltage source;

a command logic circuit responsive to either the first signal from the first relay means or the third signal from the second relay means for generating a diesel engine start signal;

said command logic circuit being further responsive to the second signal from the first relay means for generating a standby motor start signal;

the standby motor being responsive to the standby motor start signal for operating the standby motor and thereby operating the compressor; and, the diesel engine being normally turned-off when the compressor is operated by the standby motor and the diesel engine being responsive to the diesel start signal for turning on the diesel engine in order to operate the compressor in place of the standby motor.

* * * * *